Sept. 6, 1949.  G. H. MARMONT  2,480,945
ELECTRONIC MUSICAL INSTRUMENT
Filed Sept. 16, 1946  7 Sheets-Sheet 1

INVENTOR.
GEORGE H. MARMONT
BY
O. H. Fowler
ATTORNEY

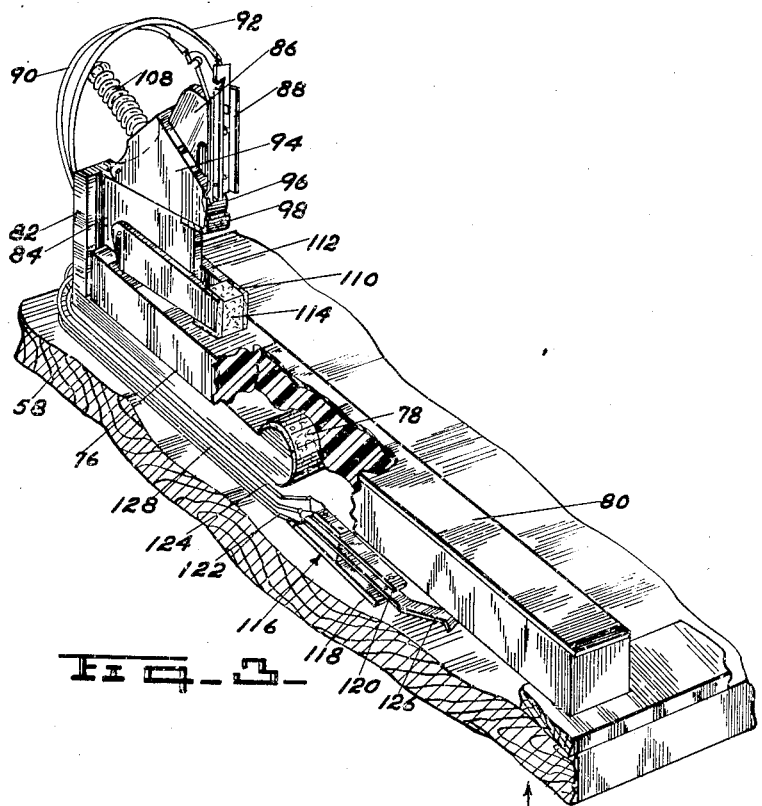
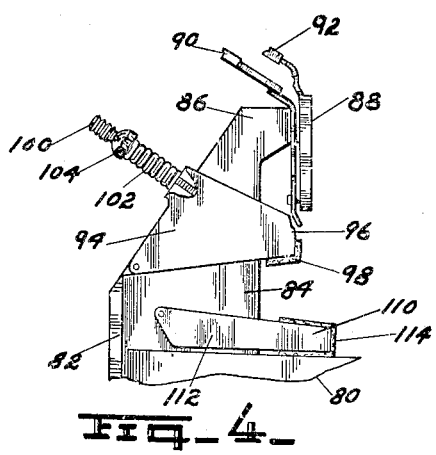
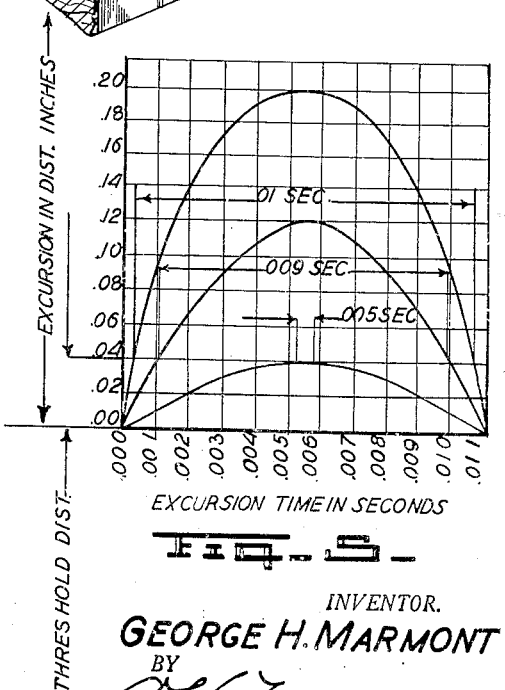

Sept. 6, 1949. G. H. MARMONT 2,480,945
ELECTRONIC MUSICAL INSTRUMENT
Filed Sept. 16, 1946 7 Sheets-Sheet 3
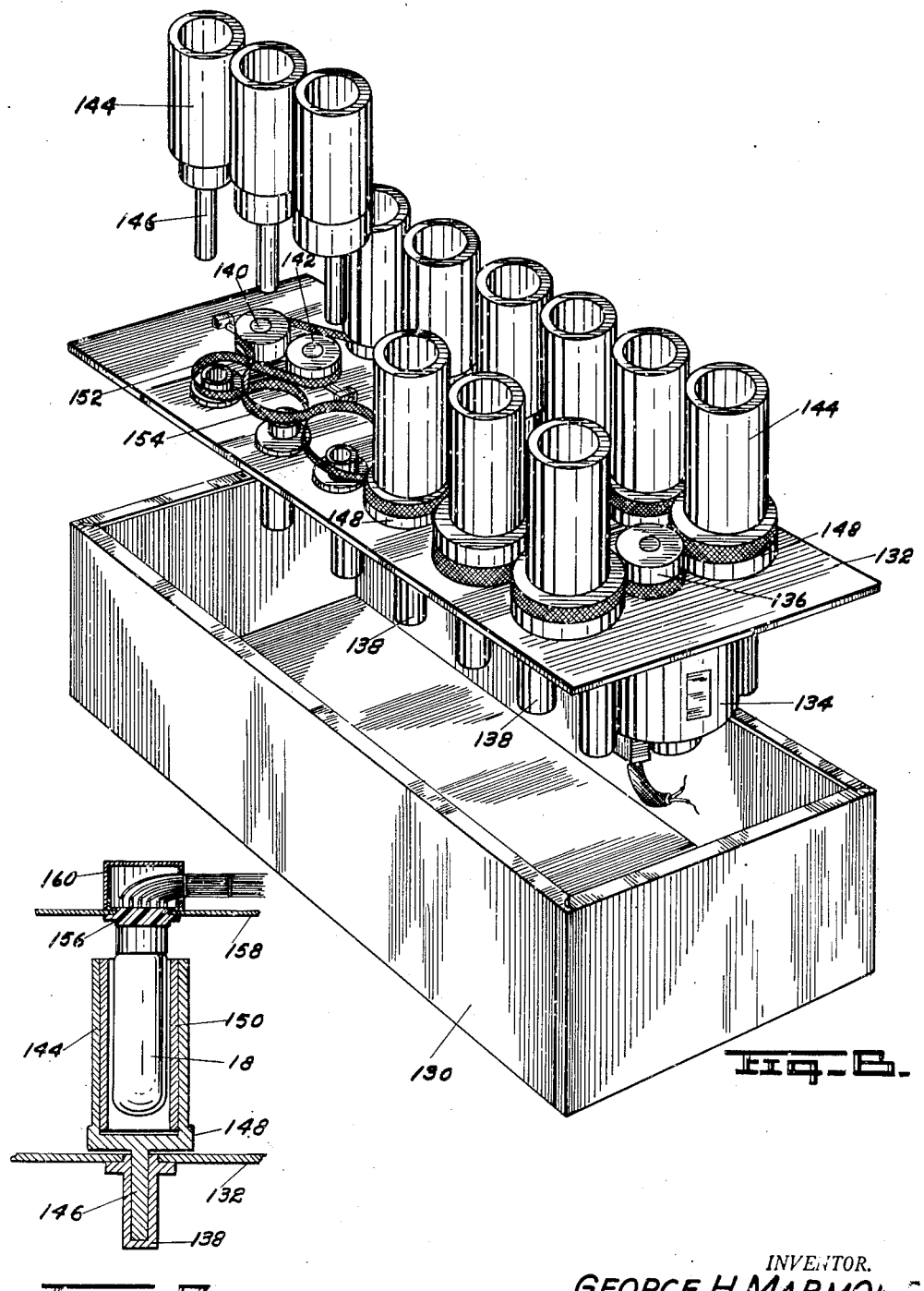
INVENTOR.
GEORGE H. MARMONT
BY
O. H. Fowler
ATTORNEY Sept. 6, 1949. G. H. MARMONT 2,480,945
ELECTRONIC MUSICAL INSTRUMENT
Filed Sept. 16, 1946 7 Sheets-Sheet 4
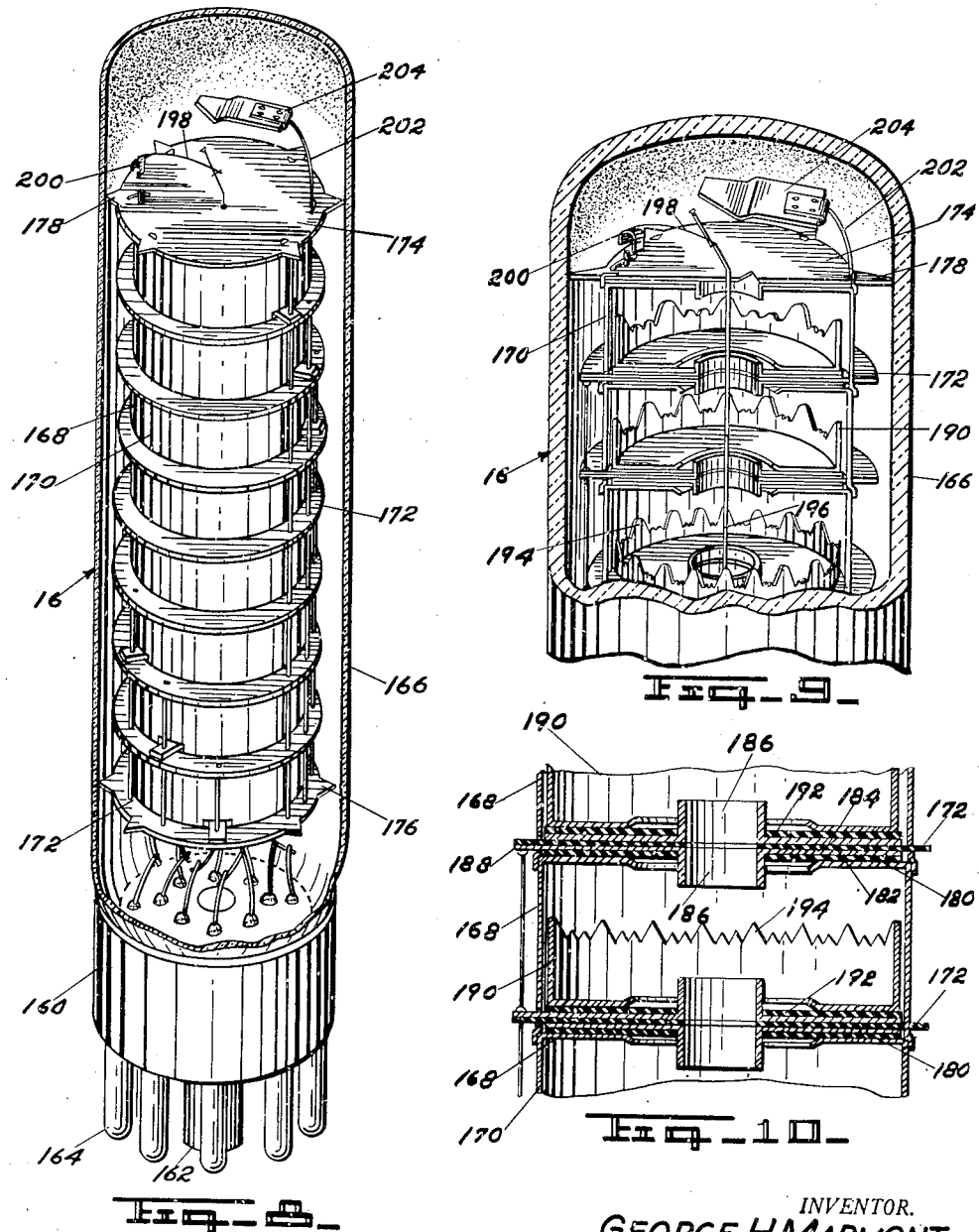
INVENTOR.
GEORGE H. MARMONT
BY
O. H. Fowler
ATTORNEY Sept. 6, 1949.  G. H. MARMONT  2,480,945
ELECTRONIC MUSICAL INSTRUMENT
Filed Sept. 16, 1946  7 Sheets-Sheet 5

INVENTOR.
GEORGE H. MARMONT
BY
ATTORNEY

INVENTOR.
GEORGE H. MARMONT
BY
ATTORNEY

Sept. 6, 1949.　　　　G. H. MARMONT　　　　2,480,945
ELECTRONIC MUSICAL INSTRUMENT

Filed Sept. 16, 1946　　　　　　　　　　　　7 Sheets-Sheet 7

Patented Sept. 6, 1949

2,480,945

UNITED STATES PATENT OFFICE 2,480,945

ELECTRONIC MUSICAL INSTRUMENT

George H. Marmont, Chicago, Ill., assignor to Bendix Aviation Corporation, Detroit, Mich., a corporation of Delaware Application September 16, 1946, Serial No. 697,324

5 Claims. (Cl. 84—1.19)

1

This invention relates to musical instruments and more particularly to a combined electronic piano and organ.

An object of the invention is to provide an electronic piano and organ which will always stay in tune, and thus avoiding periodic costs of repeated tuning operations.

Another object of the invention is to provide an electronic instrument which may be electively played either as a piano or as an organ.

Another object of the invention is to provide an electronic instrument which may be electively played either as a piano or as an organ and which will in either instance offer better tone quality than standard pianos and organs.

Another object of the invention is to provide an electronic instrument which may be electively played either as a piano or as an organ at any predetermined maximum volume or less volume level depending upon the "touch" of the performer.

Yet another object of the invention is to provide an electronic instrument which may be electively played either as a piano or as an organ and which may be encased in a small compact unit of light weight.

A further object of the invention is to provide an electronic instrument which may be readily converted into either a piano or an organ, and which may be manufactured at small cost both as to parts and assembly thereof.

Yet a further object of the invention is to provide an eletronic instrument including a piano, an organ and a radio tuner which may be selectively played, and means for recording and reproducing any selection played on these instrumentalities or otherwise rendered.

Other objects and advantages of the invention will appear from the following description when taken in connection with the accompanying drawings forming a part of this specification and in which:

Fig. 3 is a perspective view of one of the keys partly broken away so as to show the mounting thereof;

Fig. 4 is an enlarged fragmentary view in side elevation of the key;

Fig. 5 is a diagrammatical illustration of a chart showing how contact time depends on impact strength;

Fig. 6 is a perspective view of the magnet drive, showing a support for the drive and the driven elements elevated with respect to the case therefor;

2

Figure 1:
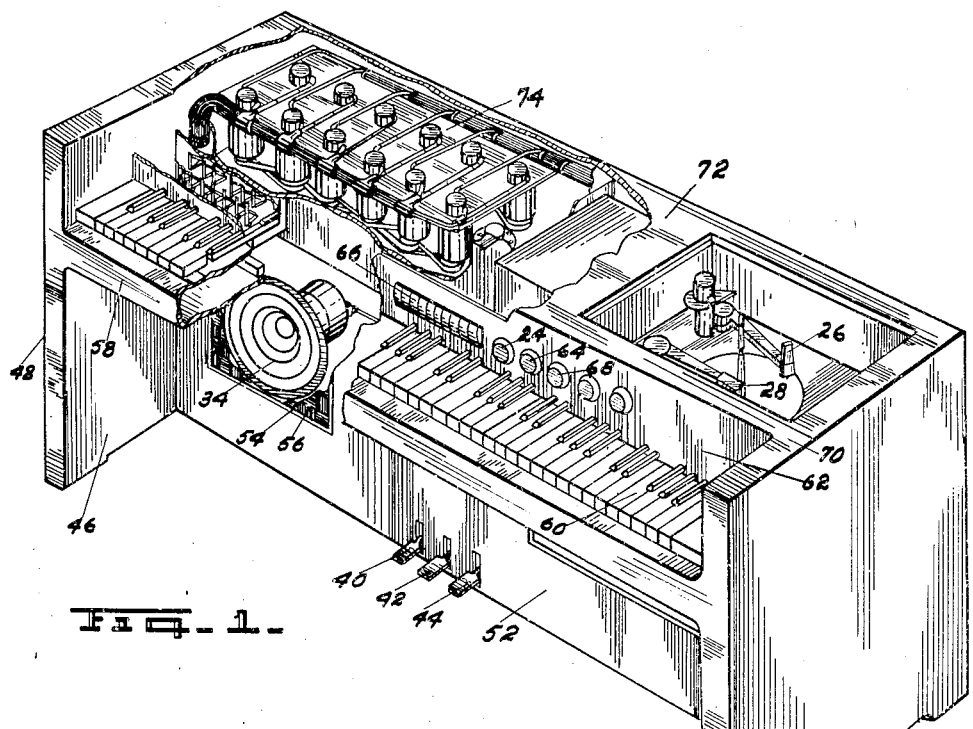
Fig. 1 is a perspective view of an electronic instrument embodying the invention, parts being broken away so as to show the interior thereof.
Figure 2:
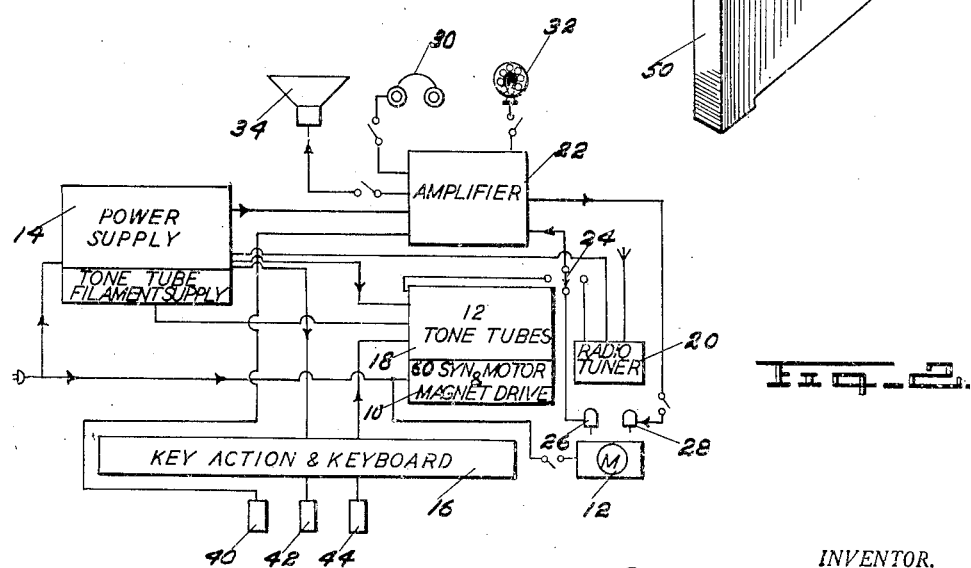
Fig. 2 is a diagrammatic illustration of an electrical circuit for the instrument, the units connected in the circuit and the relation of the units to one another.
Figure 11:
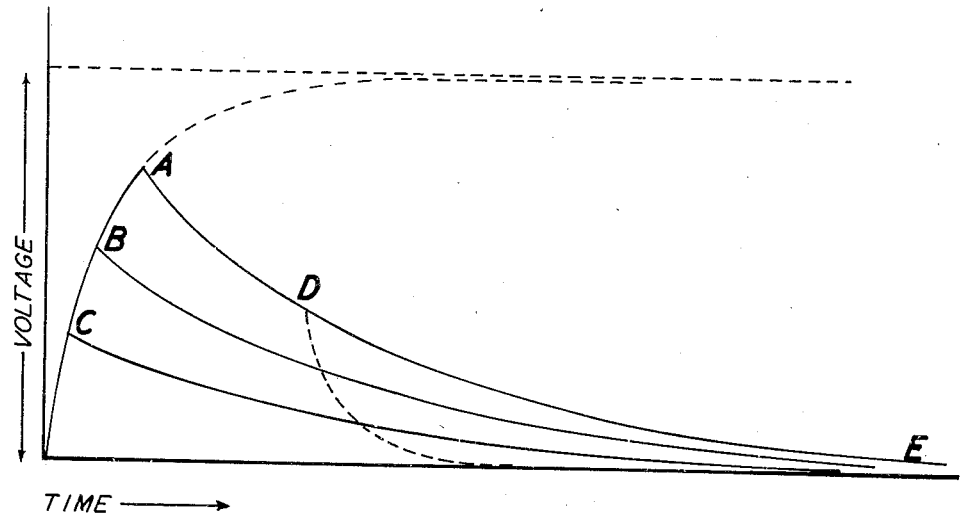
Figure 12:
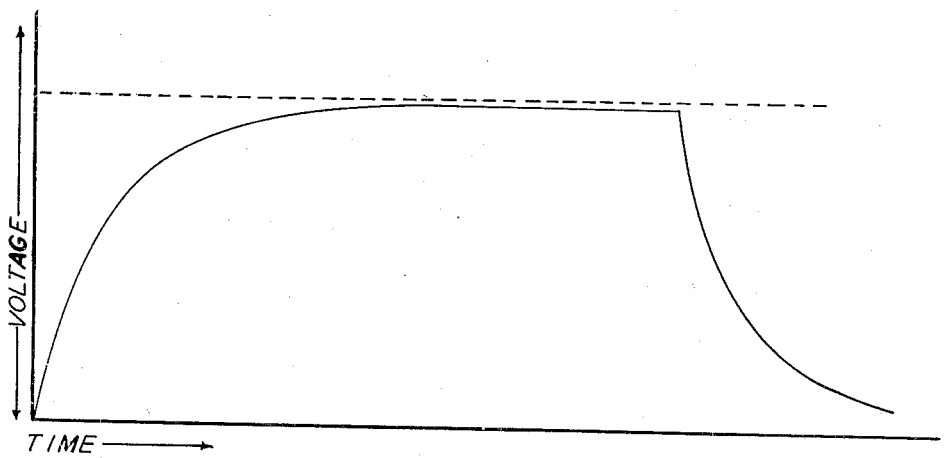
Figure 13:
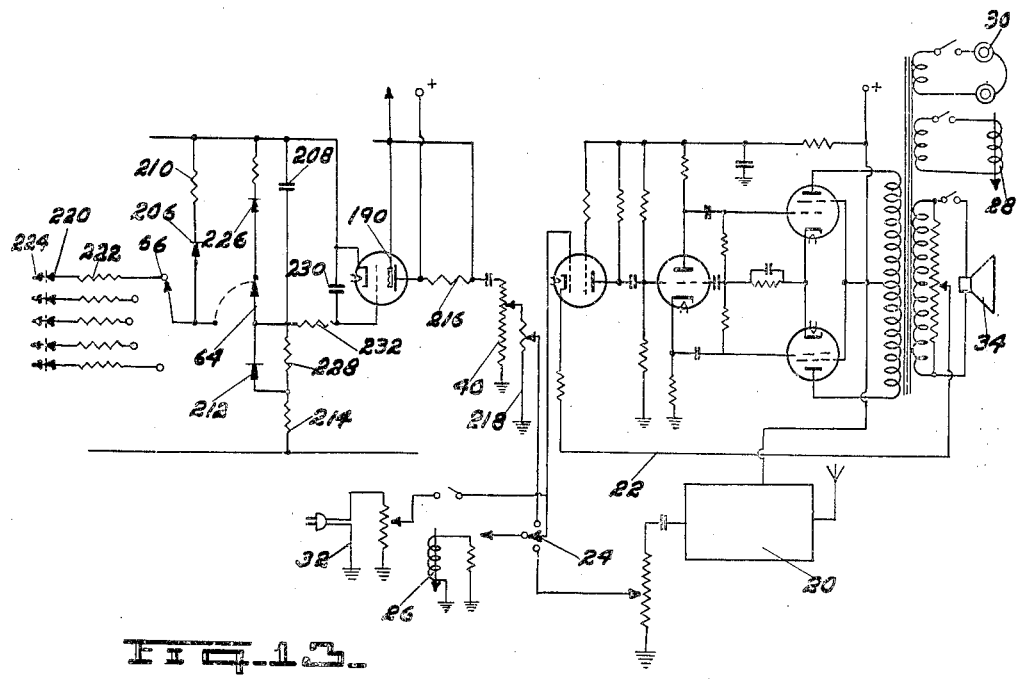
Figure 14:
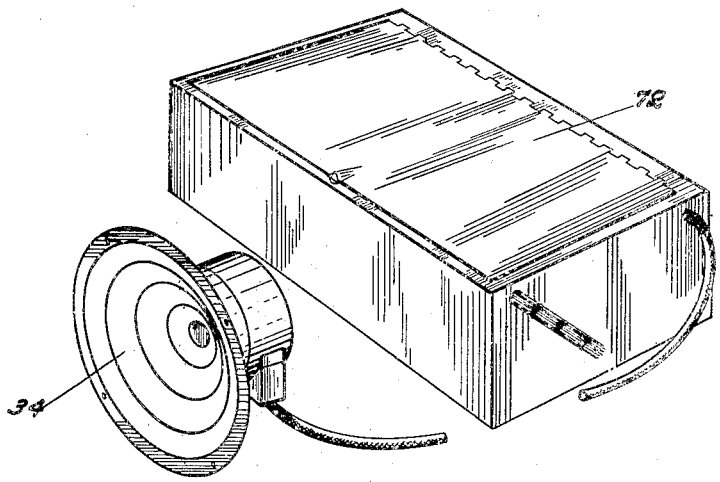

Fig. 7 is a vertical sectional view of one of the magnetic elements with a tube therein;

Fig. 8 is a perspective view of one of the tone tubes;

Fig. 9 is an enlarged fragmentary view of the tone tube in perspective with the parts in section;

Fig. 10 is an enlarged fragmentary view of the tone tube;

Fig. 11 is a chart illustrating the shape of the tone envelope for piano tones;

Fig. 12 is a chart illustrating the shape of the tone envelope for organ tones;

Fig. 13 is a diagrammatical illustration of the key action circuit;

Fig. 14 is a perspective view of the amplifier and loud speaker; and

Figure 15:
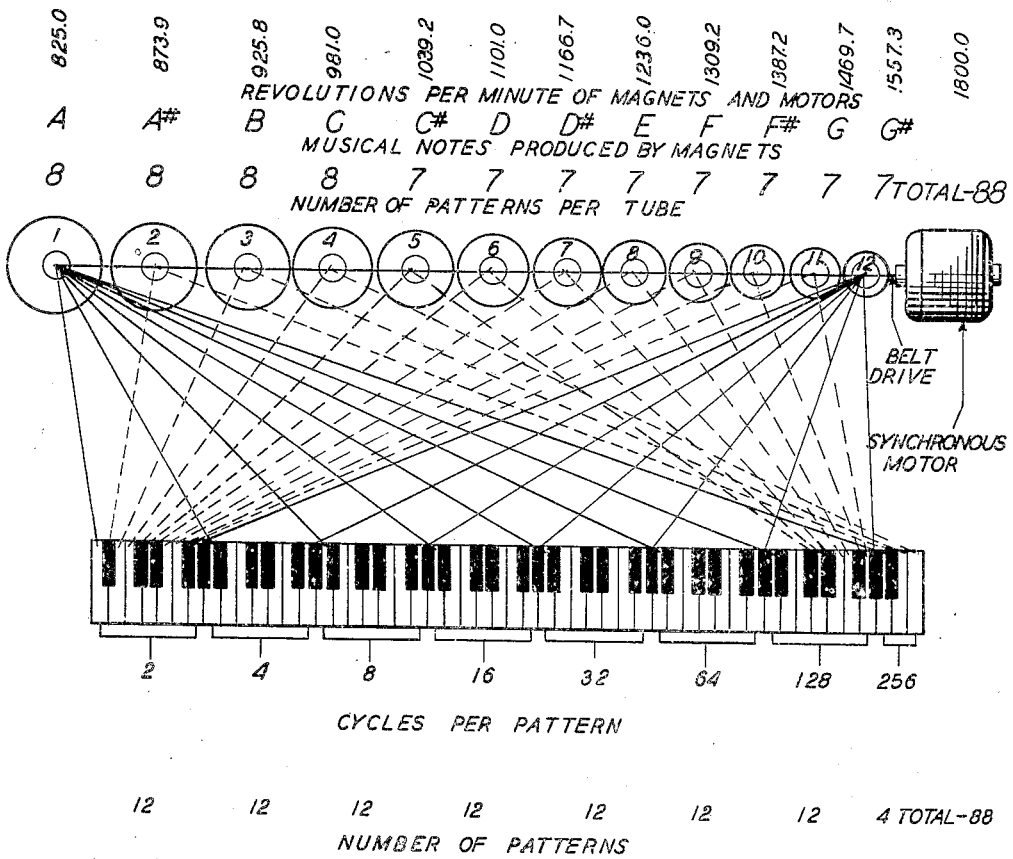

Fig. 15 is a diagrammatical illustration of the key board, the tone tubes under control thereof and the drive for the rotatable magnets.

General

A suitable electrical source of 60 cycle 110 volt current is connected to a drive unit to drive a synchronous motor 10, also to a synchronous motor 12, and to a power supply unit 14. The power supply unit 14 furnishes current of suitable character to key action 16, to tone tubes 18, to a radio tuner 20, and to an amplifier 22.

The amplifier 22 may be selectively connected through a three-way switch 24 to the tone tubes 18, to the radio tuner 20 and to a reproducer 26, associated with the motor 12. The amplifier 22 is also connected through a switch to a recorder 28 associated with the motor 12, through a switch to earphones 30, through a switch to a microphone 32, and through a switch to a loud speaker 34.

Current flowing from the power supply to the key action 16, to the tone tubes 18 and to the amplifier 22 is obtained through conventional circuits using transformers to change voltage, rectifiers to change the alternating current to direct current, filters to remove ripples from the current. The supply also contains a conventional oscillator circuit, not shown, which furnishes 100 kilocycle current to heat the filaments in the tone tubes 18.

The key action and keyboard 16 is composed of mechanical mechanism for each of the keys, and also momentary contact switches of variable time duration, damping switches and organ switches for each of the keys.

The output current from the key action and keyboard 16 regulates the grid elements in the tone tubes 18, allowing the cathode beams to flow and sweep a given pattern for a given key played. The output current from key action and keyboard 16 further controls the damping of the notes played.

The signal impulses from the tone tubes 18 are transmitted to the amplifier 22, where they undergo several stages of voltage amplification and a final stage of power amplification. The amplified music impulses from amplifier 22 are transmitted to the loud speaker 34, which turns the electrical signal into audible sounds emanating into the air, and to the ear of the listener.

There are three foot pedals for control of the instrument. They are a volume control pedal 40, which when actuated by the foot of the performer acts on the amplifier 22 to control the output volume from the instrument, a sostenuto pedal 42 for actuation of a mechanical locking system for holding the damping switches open on any keps which may be depressed when the sostenuto pedal is actuated, and a loudness or damping pedal 44, which may be actuated to operate a switch controlling the entire damping circuit of the key action and keyboard 16. By means of depressing the loudness or damping pedal 44, the notes played may be allowed to die away slowly or may be quickly damped.

At the pleasure of the operator the input of the amplifier 22 may be selectively connected to the tone tubes 18, to the radio tuner 20, to the reproducer 26 and to the microphone 32, and the output of the amplifier may be connected to either the loud speaker or the earphones, and instances where it is desired to record any particular rendition the output of the amplifier is connected to the recorder 28 for cooperation with the motor 12.

The case or cabinet

The instrument is enclosed in an ornamental case 46, preferably rectangular in general contour. As shown, the case includes corresponding end panels 48 and 50 connected by a kneeboard 52 having an opening 54 therethrough covered as by a grille or cloth 56 suitable for concealment of the loud speaker 34 arranged within the case. The kneeboard supports the foot pedals including the pedal 40 for control of the output volume of the instrument, the sostenuto pedal 42 operative to hold the damping controls off of the keys which may be depressed at the instant the sostenuto pedal is actuated by the performer and the loudness or damping pedal 44.

A base board 58 connected between and supported by the end panels 48 and 50 has arranged thereon a bank or group of keys constituting the keyboard 60 corresponding substantially to that of a conventional piano. A face board 62 connected between the end panels 48 and 50 back of the bank of keys has arranged thereon a manually actuated switch 64 for converting the instrument from a piano into an organ or vice versa, and a plurality of organ stops 66, one for each octave for overtone, the switch 24 for selectively connecting the tone tubes 18, the radio tuner 20 and the reproducer 26 to the amplifier and such other switches 68 as may be essential for control. The action mechanism of each of the keys is enclosed by the panel 62 and a top panel 70. A suitable music rack, not shown, may be supported on the face board 62 above the organ stops 66. Arranged immediately beneath the top panel within the case is a housing 72 for the electrical circuits of the instrument and a housing 74 for the drive mechanism of the instrument. The radio tuner 20, the reproducer 26, and the recorder 28 and the motor 12 are also arranged within the case beneath the top panel.

The keyboard and key action

As hereinabove stated the keyboard 60 resembles that of a conventional piano and the key action is constructed to have a similar feel to that of a piano. However, the mechanism of each of the keys of the instrument, actuated by impact of the performer's fingers upon the keys is different. Rather than causing a hammer to strike against a string, impact upon the key serves to momentarily close a switch. The length of time the switch is closed varies, approximately, from .0005 second to .01 second, the duration accurately depending upon the strength of the impact.

Since each of the keys are alike in structure, a description of one will suffice for all. As shown, a support 76 suitably mounted on the base board 58 of the case has on one end a fulcrum 78 providing a support for a key 80, and on the other end of the support is an upright 82 having a web 84 received by a slot in the inner end of the key. The web extends above the upright and terminates in a forwardly projective portion 86 for the support of a leaf spring switch 88, the terminals of which are connected by leads to 90 and 92 to binding posts, not shown, on the back of the upright 82.

An actuator 94 for the switch 88 is sleeved on and pivotally connected to the extended portion 86 of the web 84. The actuator has on its free end a cam 96 for cooperation with the compliant member or the movable element of the switch and a felt pad 98, the purpose of which will hereinafter appear.

A pin 100 threaded in the web 84 extends through an opening in the actuator 94 and a spring 102 sleeved on the pin between the actuator and an adjustment nut 104 and covered as by a boot 108 serves to urge the actuator to its position of rest.

A hammer 110 has a bifurcated shank 112 straddling the web 84 and pivotally connected thereto as by a pintle, and the free end or head of the hammer has thereon a pad 114 normally resting on the key 80 and adapted to cooperate with the pad 98 on the free end of the actuator 94 when the performer's fingers impinge upon the key.

A leaf spring 116 supported on the base 58 beneath the key 80 has spaced stationary contacts 118 and 120. The contact 118 is connected as by a lead 122 to a binding post, not shown, on the back of the support 82, and the binding post is connected to the organ section of an electrical circuit to be hereinafter described, the contact 120 is connected as by a lead 124 to a binding post, also not shown, on the back of the support 82 and this binding post is connected to the piano section of the electric circuit, and the compliant member or contactor 126 of the switch under control of the key is connected by a lead 128 to a binding post, also not shown, on the back of the support 62 and this binding post is connected in the electric circuit.

Upon striking the key 80 (actually a lever) the impact is transmitted to the pivoted hammer 110 and the hammer in turn transmits the impact to the actuator 94 the cam 96 of which engages the movable element of the switch 88 to close the circuit against the resistance of the spring 102. The actuator which possesses mass and the spring form a potentially oscillating system. However, the felt pads or dampers 98 and 114 cooperate with one another to inhibit the actuator from making more than one excursion, whereupon the actuator returns to its position of rest.

The compliant member or the movable element of the switch 88 rests against the cam 96 in such a way that, after the cam is moved through a short "threshold" distance, contact is made with the stationary member of the switch until the cam is almost returned to its rest position. It is, therefore, apparent that, although the period of excursion of the cam may be independent of impact, the fact that a "threshold" movement is required before the switch is closed means that the duration of contact of the switch depends upon the proportion of the cam's total period during which the cam is moved beyond the "threshold" position.

A hypothetical plot of the "cam excursion" versus "time" for various impacts is shown in Fig. 5 and clearly illustrates the effect of the "threshold."

The electrical circuit for the instrument hereinbefore referred to and to be later described in detail, translates the duration of contact into a voltage amplitude supplied to the grid of the corresponding element of a tone tube, also to be hereinafter described.

Associated with each key is a leaf-type contact which is open only during the time the key is depressed. Subsequent release of the key, and closure of this contact, causes damping of the note.

The key hereinabove described provides the basis of a separate patent application filed concurrently herewith.

The magnet drive unit

The purpose of the magnet drive unit 10 is to furnish a plurality of magnetic fields rotating at predetermined rates. The rotating magnetic fields properly form and rotate cathode sheets in the tone tubes 18.

As shown, a chassis 130 supports a base plate 132 having thereon a motor 134, the armature shaft of which carries a pulley 136, a plurality of sleeve bearings 138 arranged in spaced relation to one another, and spring loaded idler pulleys 140 and 142. The motor 134 is of the synchronous type.

Cylindrical cups 144 have stub shafts 146 concentrically disposed on the bottoms of the cups and fitted for free rotation in the sleeve bearings 138. The cups also have pulleys 148 adjacent the bottoms thereof. The pulleys are of graduated sizes so as to rotate the cups 144 at predetermined rates. Preferably the pulleys have crowned faces and cylindrical magnets 150 are fixedly secured in the cups.

Each of the cylindrical magnets 150 is so magnetized that the north and south poles reside in the wall of the cylinder, and in such a manner as to be diametrically disposed therein.

The magnetic lines of force are, therefore, arranged across the magnet in lines parallel to one plane passing from pole to pole and from one end of the cylinder to the other. The magnetic lines of force are also perpendicular to the longitudinal axis of the cylinder or parallel to the perpendicular lines.

Two flat belts 152 and 154 are driven by the pulley 136 on the armature shafts of the motor. The belts 152 and 154 each have 180° of surface engaged with the driving pulley 136; the idler pulleys 140 and 142 and also the pulleys 148 on the cylindrical cups. The belt 152 is carried on the pulleys above belt 154 and with its engaging surfaces diametrically disposed with respect to those of belt 154, and the crowned faces on the pulleys serve to hold the belts 152 and 154 in their up and down relation to one another.

The magnet drive hereinabove described provides the basis of a co-pending patent application filed concurrently herewith.

Tone tube

The tone tubes 16 are of the high vacuum type. They are supported in the cylindrical magnets 150 on sockets 156 mounted on a cover plate 158 and enclosed, as by removable caps 160. The tubes contain elements adapted to be activated by electrical signals from the keys to give rise to musical notes corresponding to those represented by the keys. In all there are twelve tone tubes of alike structure. Each tube corresponds to a given note in the 12-tone scale; that is, one tube contains all of the elements essential to produce all of the C's, for instance, imposed in the whole keyboard; and another tube will have all of the C#'s; and so on.

There are 88 keys in the conventional piano keyboard, covering 7⅓ octaves. Since this arrangement has proved highly desirable, it is contemplated that in the present instrument the keyboard shall have 88 keys for control of twelve identical tone tubes, each having eight different tone patterns. All eight of the tone patterns in four of the tubes are used and only seven of the tone patterns in each of the remaining eight tone tubes are used.

As shown, the base 160 having a key 162 and a plurality of pins 164 supports an envelope 166 having therein the elements of the tube. A stack of eight corresponding inverted interlocking cups 168 having concentric openings registering with one another constitutes a sectionalized anode 170 connected as by a lead to one of the pins 164.

Each of the anode sections 168 has spaced tabs on its rim, and these tabs extend through slots in an insulator 172. This serves to secure the insulators against displacement. Each insulator 172 has a concentrically disposed opening registering with the openings in the anode 170 and a diameter greater than that of the anode. Because of this enlarged diameter the insulators extend at beyond the circumference of the anode and thus provide suitable support for the leads of the other elements of the tube. Insulators 172 and 174 suitably secured to the respective ends of the anode have spaced tabs 176 and 178 which engage the wall of the envelope and serve to support the anode and insulator discs 180 are supported on each of the anode sections.

Grid elements 182 and 184 are superimposed on each of the insulators 172 and 180. Each of the grid elements includes a disc having a concentrically disposed sleeve 186 and a peripheral tab 188. The grid elements 182 and 184 are assembled in pairs with the sleeves 186 extended in opposite directions, except at the respective ends of the anode where there is but one grid element with its sleeve 186 extended inwardly of the anode. The sleeves 186 are concentrically disposed with relation to the openings in the sections 168 of the anode and the peripheral tabs 188 of the grid elements extend through suitable openings in the wall of the anode. The tab of one grid element in each pair is connected to the tab of the one of the grid elements of the pair immediately above and to one of the pins 162 which, in turn, is connected in a key circuit to be hereinafter described.

A tone pattern 190 is associated with each pair of grid elements. Each tone pattern is supported on one of the grid elements of each pair of grid elements with an insulator disc 192 interposed. Each of the tone patterns includes a cup having in its bottom a concentrically disposed opening registering with the openings in the anode and grid elements, and the rim of the cup is deformed and/or cut to provide a profile 194 for the rendition of a specific tone, and the tone patterns are connected in parallel to one of the pins which, in turn, is connected in the key circuit.

A filamentary cathode 196 connected to one of the pins 164 which, in turn, is connected to a cathode bus bar, extends axially of the anode, the grid elements and the tone patterns, and through an axial opening in the insulator 174, and a light spring 198 connected to the cathode and to a fixed support 200 on the insulator 174 serves to impose tension on the cathode so that it will remain in the desired position under all conditions, regardless of heat inherently resulting in extension.

A bracket or support 202 on the insulator 174 supports a plate 204 generally known in the art as a "getter." The getter may be of any preferred type suitable for the collection of gas which may be in the envelope.

The anode and the tone patterns are held at a convenient positive potential such as 100 volts relative to the cathode potential. Normally the grid is held at sufficient negative potential to suppress electron emissions from the cathode. When a given note is played, however, the grid assumes a more positive potential (but never one more positive than the cathode), thereby allowing electrons to be attracted outward from the cathode.

The tubes are supported in the rotatable magnets 150 which have opposite poles effective to create a magnetic field in diametral relation to the tube. This magnetic field acts upon the electrons emitted from the cathode of the tube in such a manner as to compose the electrons into a flat sheet or plane which is parallel to the lines of magnetic flux and which includes the cathode.

The electrons are electrostatically attracted to the anode and are collected in part by the pattern electrode and in part by the anode. Clearly, then the proportion of electrons collected by the pattern electrode depends upon the angle of rotation of the beam at any particular instant.

In other words, the number of electrons collected by the pattern electrode varies as the magnetic field rotates. From this it is clear that an electrical signal appearing upon either the pattern electrode, or the anode or upon both may be suitably connected to an amplifier and a loud speaker to produce a tone.

A feature of the tube is a plurality of cooperative elements capable of producing a number of tones in integer or octave relationship to one another. The tones may be produced individually or collectively.

One section of the tube has a pattern electrode containing two cycles. Accordingly, as the magnet rotates a tone is produced, the fundamental frequency of which is twice the rotatable frequency of the magnet. Another section of the tube has a pattern electrode containing four cycles and, accordingly it will produce a tone an octave higher. Yet another section of the tube has a pattern electrode containing eight cycles and it will therefore produce a tone two octaves above the first tone, and so on. It is to be borne in mind that the pattern electrodes are not sine waves but are characterized in that they contain a fundamental of frequency and the desired harmonics.

The vacuum tube hereinabove described provides the basis of a copending patent application filed concurrently herewith.

The electrical circuit for the instrument

An electrical circuit for the instrument includes a circuit for producing tone notes, for enveloping the tone notes and finally amplifying and reproducing the tone notes as audible sounds.

The selector switch 64 may be manipulated to convert the instrument into an organ. Under this condition when a key is depressed an organ tone switch 206 is closed, causing a grid time control condenser 208 to be discharged through an organ rise time control resistor 210. The discharge of the grid time control condenser will cause the potential of the grid associated with the tone element 190 to rise above the cutoff value, and the cathode beam will sweep the pattern of the tone tube, as long as the key is depressed. When the key is released a damping switch 212 closes, whereupon the control condenser recharges back to cutoff value through the damping resistor 214. The resulting tone envelope is depicted in Fig. 12.

The tone element 190 is connected to the positive source through a load resistor 216. This causes the tone element to be held at the full potential of the positive source during periods of no cathode beam flow. As the cathode beam flows sweeping the tone element, the potential of the tone element is driven down to lower values than that of the positive source. The fluctuating potential of the tone element is transmitted through a coupling condenser to the pedal volume control 40 and a manually operative volume control 218. These volume controls may be of the variable resistance variety, or may be of the rotating cathode beam type. The signal from the volume controls 40 and 218 are passed through an amplifier circuit, in this instance one employing two stages of voltage amplification and one stage of push pull power amplification. Since this type of amplifier is well known in the art a description thereof is deemed unnecessary. The amplified signal is passed to the loud speaker unit 34. The process occurring from the depression of the key until the sound is produced is the same for each note, and any and all notes may be sounded simultaneously.

A series of organ stop selector switches 66 provide means by which the harmonic notes in other octaves may be sounded when a key is depressed to sound a fundamental note. This action takes place through organ stop contacts 220, organ stop resistors 222, organ stop leads 224 to the grids of the tone elements 190 of the harmonic notes in other octaves.

When the selector switch 64 is manipulated to convert the instrument into a piano upon depressing a key, a piano variable time switch 226 is closed. The greater the energy applied to the key the longer the piano variable time switch 226 remains closed. During the time piano key switch 226 is closed the grid time control condenser 208 becomes progressively discharged; that is the longer the piano key switch 226 is closed the lower the final resulting potential across the grid time control condenser 208. As the potential across the grid time control 208 changes the potential on the grid in the tone element departs from the cutoff value. The greater the potential departure from the cutoff value, the stronger the cathode beam flow becomes, and hence the louder the ultimate sound produced.

Immediately upon the opening of the piano key switch 226 the grid time control condenser 208 begins to recharge through a tone decay time resistor 228. As the grid time control condenser 208 regains its charge, the grid associated with the tone element 190 approaches the cutoff potential; whereupon the amplitude of the note begins to decay, and when the cutoff potential is reached the cathode beam flow ceases and the note played is silenced.

The resulting tone envelope is clearly shown in Fig. 11, wherein the curves A, B and C show the relative shape of the envelope for heavy, medium and light key impacts. The selection of the curve A starting at D is the envelope obtained when the note is damped by release of the key. Closing of the damping switch effectively decreases the damping resistance and, therefore shortens the time of condenser charge. The resistance value of the tone decay time resistor 228 is of a high value, and to be exact, such that the recharging time of grid time control condenser 208 will be equal to that of a piano note decay time.

When the key is released after depressing the damping switch 212 closes, causing the grid time control condenser 208 to be recharged through the tone damping resistor 214. The resistance value of the tone damping resistor 214 is of a relatively low order, and to be exact, of such a value that the time of recharge of grid time control condenser 208 is equal to the time of damping of a note in a piano.

A condenser 230 and a resistor 232 comprise a filter for the purpose of removing key clicks.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a combination electronic piano and organ, a bank of vacuum tubes each having a cathode, an anode, a plurality of grids and a plurality of pattern electrodes, a condenser connected to each of the grids and charged from a power supply for maintaining the bias voltage of each grid at cutoff potential, means operative in one phase to depart from grid cutoff potential by partially discharging the condensers, and in another phase to completely discharge the condensers and maintain discharge thereof, means for amplifying signals from the pattern electrode of each tube and means for transforming the signals into audible sounds.

2. In a combination electronic piano and organ, a bank of vacuum tubes, each having a cathode, an anode, a plurality of grids and a plurality of pattern electrodes, a condenser connected to each of the grids and charged from a power supply for maintaining the bias voltage of each grid at cutoff potential, means operative in one phase to depart from grid cutoff potential by partially discharging the condensers and controlling charge thereof, and in another phase to completely discharge the condensers and maintain discharge thereof, means for amplifying signals from the pattern electrode of each tube and means for transforming the signals into audible sounds.

3. In an electronic musical instrument, a bank of vacuum tubes each having a cathode, an anode, a plurality of grids and a plurality of pattern electrodes, magnetic means for deflecting electrons from the cathode of each tube into a beam, means for sweeping the beams over the pattern electrodes, a condenser connected to each of the grids and charged from a power supply for maintaining the bias voltage of each grid at cutoff potential, means operative in one phase to depart from grid potential by partly discharging the condensers, and in another phase to completely discharge the condensers and maintain discharge thereof, means for amplifying signals from the pattern electrodes of each tube and means for transforming the signals into audible sounds.

4. In an electronic musical instrument, a bank of vacuum tubes each having a cathode, an anode, a plurality of grids and a plurality of pattern electrodes, magnetic means for deflecting electrons from the cathode of each tube into a sheet, means for sweeping the sheets over the pattern electrodes, a condenser connected to each of the grids and charged from a power supply for maintaining the bias voltage of each grid at cutoff potential, means operative in one phase to depart from grid cutoff potential by partially discharging the condensers and controlling charge thereof and in another phase to completely discharge the condensers and maintain discharge thereof, means for amplifying signals from the pattern electrode of each tube and means for transforming the signals into audible sounds.

5. In an electronic musical instrument, a bank of vacuum tubes each having a cathode, an anode, a plurality of grids and a plurality of pattern electrodes, magnetic means for deflecting electrons from the cathode of each tube into a sheet, means for rotating the magnetic means so as to sweep the sheets over the pattern electrodes, a condenser connected to each of the grids and charged from a power supply for maintaining the bias voltage of each grid at cutoff potential, means operative in one phase to depart from grid cutoff potential by partially discharging the condensers and controlling charge thereof and in another phase to completely discharge the condensers and maintain discharge thereof, means for amplifying signals from the pattern electrodes of each tube, and means for transforming the signals into audible sounds.

GEORGE H. MARMONT.

REFERENCES CITED

The following references are of record in the file of this patent:

UNITED STATES PATENTS

| Number | Name | Date |
| --- | --- | --- |
| 1,782,542 | Miller | Nov. 25, 1930 |
| 1,832,402 | Langer | Nov. 17, 1931 |
| 2,075,802 | Davis | Apr. 6, 1937 |
| 2,126,464 | Hammond | Aug. 9, 1938 |
| 2,148,166 | Kucher | Feb. 21, 1939 |
| 2,171,936 | Kucher | Sept. 5, 1939 |
| 2,173,888 | Smiley | Sept. 26, 1939 |
| 2,217,774 | Skellett | Oct. 15, 1940 |
| 2,391,967 | Hecht et al. | Jan. 1, 1946 |